US006574221B1

(12) United States Patent
Petersen (10) Patent No.: US 6,574,221 B1
(45) Date of Patent: Jun. 3, 2003

(54) ASYNCHRONOUS TRANSFER MODE PLATFORM FOR MOBILE COMMUNICATIONS

(75) Inventor: Lars Göran Petersen, Tumba (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/039,453

(22) Filed: Mar. 16, 1998

Related U.S. Application Data (60) Provisional application No. 60/068,097, filed on Dec. 19, 1997.

(51) Int. Cl.[7] ............................................. H04L 12/56
(52) U.S. Cl. ................................. 370/395.1; 370/422
(58) Field of Search ................................ 370/338, 335, 370/342, 395, 469, 396, 320, 331, 397, 399, 400, 409, 420, 422, 470

(56) References Cited

U.S. PATENT DOCUMENTS

| | | | | |
|---|---|---|---|---|
| 5,195,090 A | * | 3/1993 | Bolliger et al. ............ 370/94.1 |
| 5,305,308 A | * | 4/1994 | English et al. ............. 370/32.1 |
| 5,363,369 A | | 11/1994 | Hemmady et al. | |
| 5,420,863 A | * | 5/1995 | Taketsugu et al. ......... 370/95.3 |
| 5,428,607 A | * | 6/1995 | Hiller et al. ............... 370/60.1 |
| 5,633,868 A | * | 5/1997 | Baldwin et al. ............ 370/331 |
| 5,729,536 A | * | 3/1998 | Doshi et al. ................ 370/328 |
| 5,774,461 A | * | 6/1998 | Hyden et al. ............... 370/329 |
| 5,889,816 A | * | 3/1999 | Agrawal et al. ............ 375/220 |
| 5,949,785 A | * | 9/1999 | Beasley ...................... 370/398 |
| 5,999,813 A | * | 12/1999 | Lu et al. ..................... 455/435 |
| 6,014,564 A | * | 1/2000 | Donis et al. ................ 455/436 |
| 6,018,521 A | * | 1/2000 | Timbs et al. ................ 370/342 |
| 6,208,633 B1 | * | 3/2001 | Jouppila et al. ............ 370/338 |
| 6,240,090 B1 | * | 5/2001 | Enhager ..................... 370/395 |

FOREIGN PATENT DOCUMENTS

EP 0 798 943 A 10/1997

OTHER PUBLICATIONS

*MASCOTS '95. Proceedings of the Third International Workshop on Modeling, Analysis, and Simulation of Computer and Telecommunication Systems*, (Cat. No. 95th 8028), pp. 427–431, XP000749692, ISBN 0–8186–6902–0, 1995, Los Alamitos, California, USA, IEEE Comput. Soc. Press, USA, B.G. Marchent, "Performance evaluation of signalling procedures for 3rd generation mobile systems".

(List continued on next page.)

*Primary Examiner*—Alpus H. Hsu
*Assistant Examiner*—Toan Nguyen
(74) *Attorney, Agent, or Firm*—Nixon & Vanderhye, PC (57) ABSTRACT

A mobile radio communications network includes mobile radio units, radio base stations for communicating with the mobile radio units over a radio-based channel, and a radio switching controller connected to the radio base stations for routing calls to and from various ones of the base stations. Each of the radio base stations, the radio switching controller, and/or other nodes in the mobile radio communications network includes an asynchronous transfer mode (ATM) switch connected to plural function modules. Signaling and traffic communications between the function modules are effected asynchronously to efficiently meet current service bandwidth/data rate demands using the ATM switch and ATM switching protocol. Each function module includes a data processing circuitry that performs ATM cell buffering and other ATM control tasks in addition to other dedicated application tasks for supporting mobile radio communications. Capacity is readily increased by modularly adding function modules to vacant ports on the ATM switch without having to modify existing function modules already connected to the ATM switch. This provides considerable flexibility and scalability to adapt the radio communications network to current needs.

37 Claims, 7 Drawing Sheets

OTHER PUBLICATIONS

*International Zurich Seminar on Digital Communications Intelligent Networks and Their Applications,* Feb. 21, 1996, pp. 251–262, XP000646127, J. De Vriendt et al., "The UMTS Mobility Server: A Solution to Support Third Generation Mobility in ATM".

MASCOT '95. *Proceedings of the Third International Workshop on Modeling, Analysis, and Simulation of Computer and Telecommunication Systems,* (Cat. No. 95$^{th}$8028), pp.427–431, XP000749692, ISBN 0–8186–6902–0, 1995, Los Alamitos, California, USA, IEEE Comput. Soc. Press, USA, B.G. Marchent, "Performance evaluation of signaling procedures for $3^{rd}$ generation mobile systems".

*International Zurich Seminar on Digital Communications Intelligent Networks and Their Applications,* Feb. 21, 1996, pp. 251–262, XP000646127, J. DeVriendt et al., "The UMTS Mobility Server: A Solution to Support Third Generation Mobility in ATM".

* cited by examiner

ASYNCHRONOUS TRANSFER MODE PLATFORM FOR MOBILE COMMUNICATIONS

This application claims the benefit of Provisional Application No. 60/068,097, filed Dec. 19, 1997.

FIELD OF THE INVENTION

This invention pertains to telecommunications, and more particularly, to the architecture and configuration of various nodes in a mobile communications network.

BACKGROUND AND SUMMARY OF THE INVENTION

There is an ever increasing convergence of the media industry (including television, video, three dimensional graphics, electronic publishing, and entertainment), the computer industry (including desktop computer, personal computers connected by local area networks, electronic mail, Internet web sites, etc.), and the telecommunications industry (including both fixed and wireless communications networks). At the same time, the use of digital mobile communications devices is virtually exploding. The challenge for the next generation of mobile communications systems is the delivery of multimedia services.

Each one of these various industry services has its own bandwidth or data rate requirement. Voice, text, graphics, video, and Internet communications each have varying speed and other Quality of Service (QoS) requirements. Increasing numbers of subscribers along with the increased numbers of new services also increase bandwidth demands. At the same time, bandwidth is a limited resource—particularly in the area of mobile radio communications.

Despite this limited radio bandwidth, there is increased pressure to meet the challenges of increased capacity, service offerings, and data rates in cellular mobile radio communications systems. The inventor of the present invention recognized that at least some of these challenges could be met by restructuring mobile communications networks using asynchronous transfer mode (ATM) technology. The inventor recognized in particular that different types of traffic—so-called multimedia traffic—could be better and more efficiently carried asynchronously rather than synchronously as in existing mobile communication systems. While the peak bandwidth requirement of multimedia traffic sources may be quite high, e.g., high resolution, full motion video, the duration for which that peak bandwidth is needed is relatively modest. In other words, while bursts of data ideally should be transmitted at the peak rate of the burst, the average arrival time between bursts may be quite large and randomly distributed. Conventional, hierarchical, and channelized multiplexing and switching architectures commonly used in mobile communications are designed primarily for voice services and do not efficiently support bursty, high bandwidth applications. Consequently, the inventors of the present invention recognized that a mobile communications network architecture based on asynchronous transfer mode multiplexing and switching would be better suited to handle bursty, multimedia traffic.

ATM utilizes "labeled" multiplexing and switching as opposed to "positional" multiplexing and switching in synchronous time division multiple access (TDMA) systems. Labeled multiplexing automatically adapts how much bandwidth is allocated to the size of the data block (referred to as a "cell" in ATM parlance) associated with each label. In addition, ATM is fundamentally a connection-oriented telecommunications approach which means that a connection is established between two stations before data is transferred between them. Because an ATM connection specifies the transmission path, ATM cells "self-route" through an ATM network. Another significant advantage of connection-oriented communication is that a guaranteed quality of service (QoS) may be guaranteed for each connection.

Therefore it is an object of the present invention to provide a mobile radio network communications architecture that efficiently handles multimedia communications services.

Mobile radio communication systems of the present invention include mobile radio units, radio base stations for communicating with the mobile radio units over a radio-based channel, and a radio switching station connected to the radio base stations for routing calls to and from various ones of the base stations. Each of the radio base stations and/or the radio switching station includes an asynchronous transfer mode (ATM) switch connected to plural function modules. Signaling and traffic communications between the function modules are effected asynchronously to efficiently and flexibly meet the current service bandwidth/data rate demands using the ATM switch and ATM switching protocols. Each function module includes a data processor and performs numerous ATM operations including cell buffering, for example. Each of the data processors communicates via the ATM switch using an ATM adaptation layer (AAL) protocol.

One or more of the function modules includes an extension module to permit communications with another ATM switch. The other ATM switch may be located, for example, at another base station. An ATM-based connection connects the two base stations in "cascade" via respective exchange terminal modules. In this fashion, additional base stations are easily added in modular fashion to increase the capacity of the radio communications network.

Capacity is also readily added to a base station or to a radio switching station as a result of the inventive architecture by modularly adding new function modules to vacant ports on the ATM switch. Existing function modules already connected to the ATM switch need not be modified or even taken off-line while new modules are added. This considerable flexibility and scalability allows fast and easy adaptation of the radio communications system to current demands. For example, a smaller radio communications network may start operation with a smaller number of function modules connected to each ATM switch node. As the network grows and expands, new nodes and/or function modules may be readily added to provide new services, service additional subscribers, etc. Additional modules may also include further extension modules as described above for cascading further base stations and/or radio switching stations. In even larger systems, one or more intermediate base station controllers may be added between the base stations and the radio switching station. The base station controller includes the similar architecture of an ATM switch connected to a plurality of function modules where communications between the function modules are effected using the ATM switch.

In a preferred embodiment, the radio mobile units and radio base stations communicate using a wideband, code division multiple access (CDMA) techniques. Wideband CDMA techniques further increase the capacity and flexibility of the radio communications network to deliver multimedia, broadband services.

These and other objects and advantages of the present invention are described more fully below in conjunction with the drawings and the detailed description of the invention.

BRIEF DESCRIPTION OF THE DRAWINGS

The present invention is illustrated by way of example and not limitation in the accompanying figures in which like reference numerals indicate like elements and in which.

DETAILED DESCRIPTION OF THE DRAWINGS

In the following description, for purposes of explanation and not limitation, specific details are set forth, such as particular architectures, applications, interfaces, techniques, etc. in order to provide a thorough understanding of the present invention. However, it will be apparent to one skilled in the art that the present invention may be practiced in other embodiments that depart from these specific details. In other instances, detailed descriptions of well-known methods, protocols, devices, and circuits are omitted so as not to obscure the description of the present invention with unnecessary detail.

The present invention provides an ATM-based platform for constructing mobile radio communications network stations or nodes. For example, in the public land mobile network (PLMN) 10 in FIG. 1, three such stations or nodes 12 and 20 are shown that employ the ATM platform. A mobile switching controller (MSC) 12 interfaces the public land mobile network 10 with other fixed networks such as the public switched telephone network (PSTN), the integrated services digital network (ISDN), etc. The two base stations 20 interface the MSC 12 with the individual mobile stations 30 over an air interface.

Figure 1:
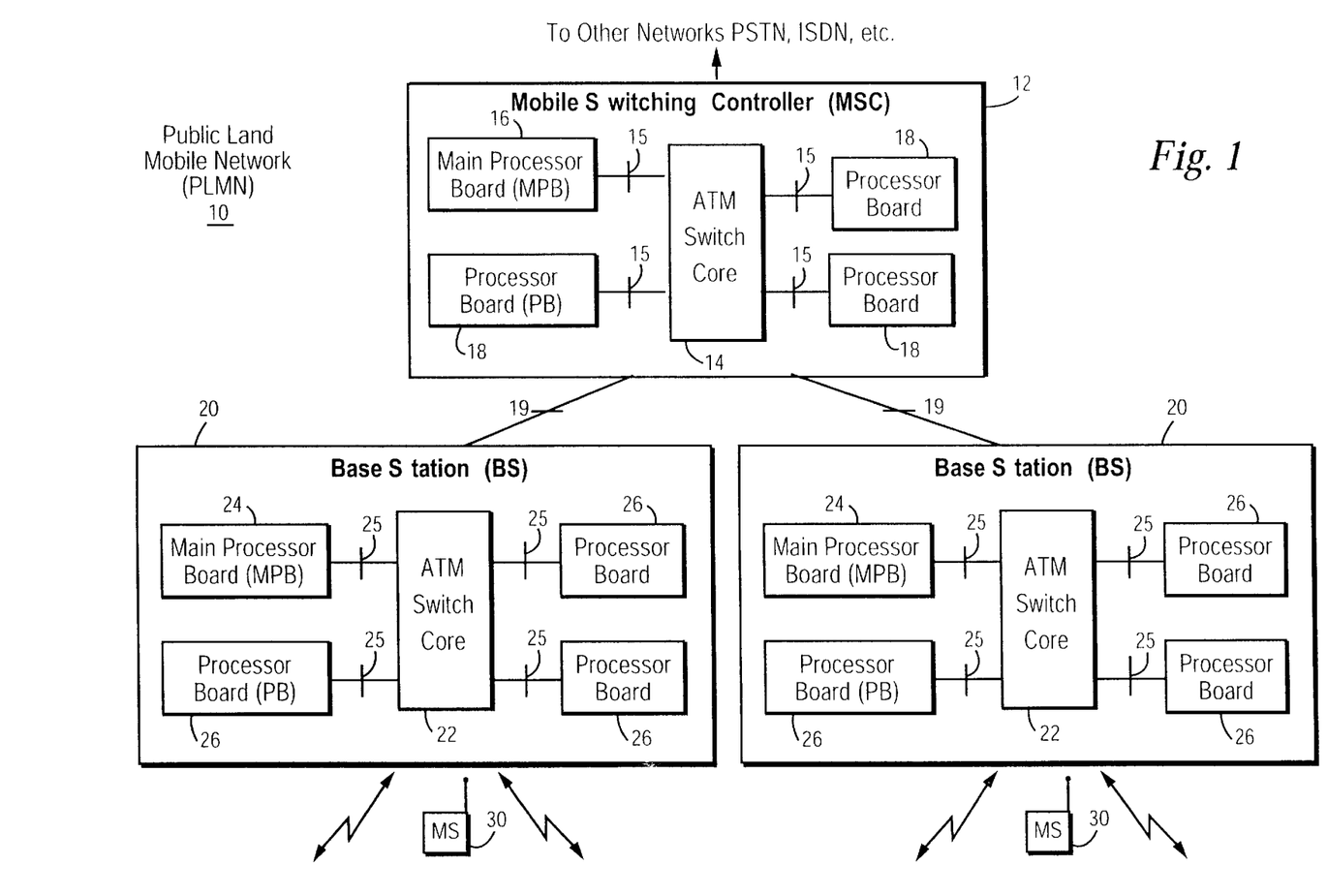
FIG. 1 illustrates a mobile radio telecommunications network in which an example embodiment of the present invention may be implemented.

Mobile switching controller 12 includes an ATM switch core 14. Attached to slots of the ATM switch core 14 are a plurality of function module boards including a main processor board (MPB) 16 and several processor boards (PB) 18. For brevity, function module boards are sometimes simply referred to as an MPB/PB. Each processor board includes data processing circuitry and memory for storing programs and data as described in further detail in conjunction with FIG. 2 below. The processors communicate signaling messages and traffic over connections established through the ATM switch core using asynchronous transfer procedures through an ATM interface 15. In general, the mobile switching controller 12 sets up and controls call connections to and from mobile stations 30 as well as provides supplementary services. Given the mobility of mobile stations 30, the MSC 12 updates mobile subscriber data and mobile subscriber locations using appropriate databases (not shown). The MSC 12 also handles speech path continuity of mobile subscribers, sometimes referred to as "handover" or "handoff."

The mobile switching controller 12 is connected to a plurality of base stations 20 (only two are shown for purposes of illustration), through a traffic and signaling interface 19. Each base station 20 includes an ATM switch core 22. A plurality of processor boards 26 and a main processor board 24 are connected to ATM switch core 22 over ATM interface 25. Base stations 20 handle the radio interface to the mobile radio stations 30 and include radio equipment such as transceivers and antennas needed to serve one or more cells in the network 10. Such functions may include radio transmission; radio signal reception from mobile stations including equalizing and diversity functions to compensate for fading effects; quality measurements for measuring signal strength and quality on uplink and downlink connections between the base station and the mobile stations; timing and alignment measurements; base station radio transmitter power control and mobile station power control; multiplexing on the radio path; channel coding; interleaving; in some instances encryption, broadcasting system information and paging messages; and receiving radio channel requests from mobile stations. In a preferred embodiment, these functions are distributed to various ones of the board processors 26.

Being built upon an ATM platform, the public land mobile network 10 employs a connection-oriented ATM transmission protocol based on fixed length cells. The ATM protocol is asynchronous in the sense that cells containing information from an individual network user do not necessarily repeat at periodic intervals. Each ATM cell typically (though not necessarily) includes fifty-three bytes of which five bytes form an ATM cell header and forty-eight bytes convey the actual information provided for transmission, sometimes referred to as the "payload." For each ATM segment or link in an ATM connection, each ATM cell is associated with a given "virtual channel" or connection supported by a physical link. Each connection is identified by two subfields in the header: the virtual channel identifier (VCI) and the virtual path identifier (VPI). Together, these fields are used in multiplexing, demultiplexing, and switching a cell through the mobile radio network 10 for a particular connection. The VCI and VPI are not addresses. Rather, they are explicitly assigned in each ATM segment or link when a connection is established, and they remain for the duration of the connection.

When the ATM switch receives an incoming cell on an input port, it must determine which output port to route the cell based on the incoming cell's VPI, VCI, and input port physical identifier. The ATM switch determines new VPI and VCI values to substitute into the cell header so that the cell is correctly routed by the next ATM network segment. The ATM switch typically looks up this connection information in a VP/VC connection table based on the cell header's VPI and VCI information plus additional "physical layer" information identifying the input ATM switch port.

Figure 2:
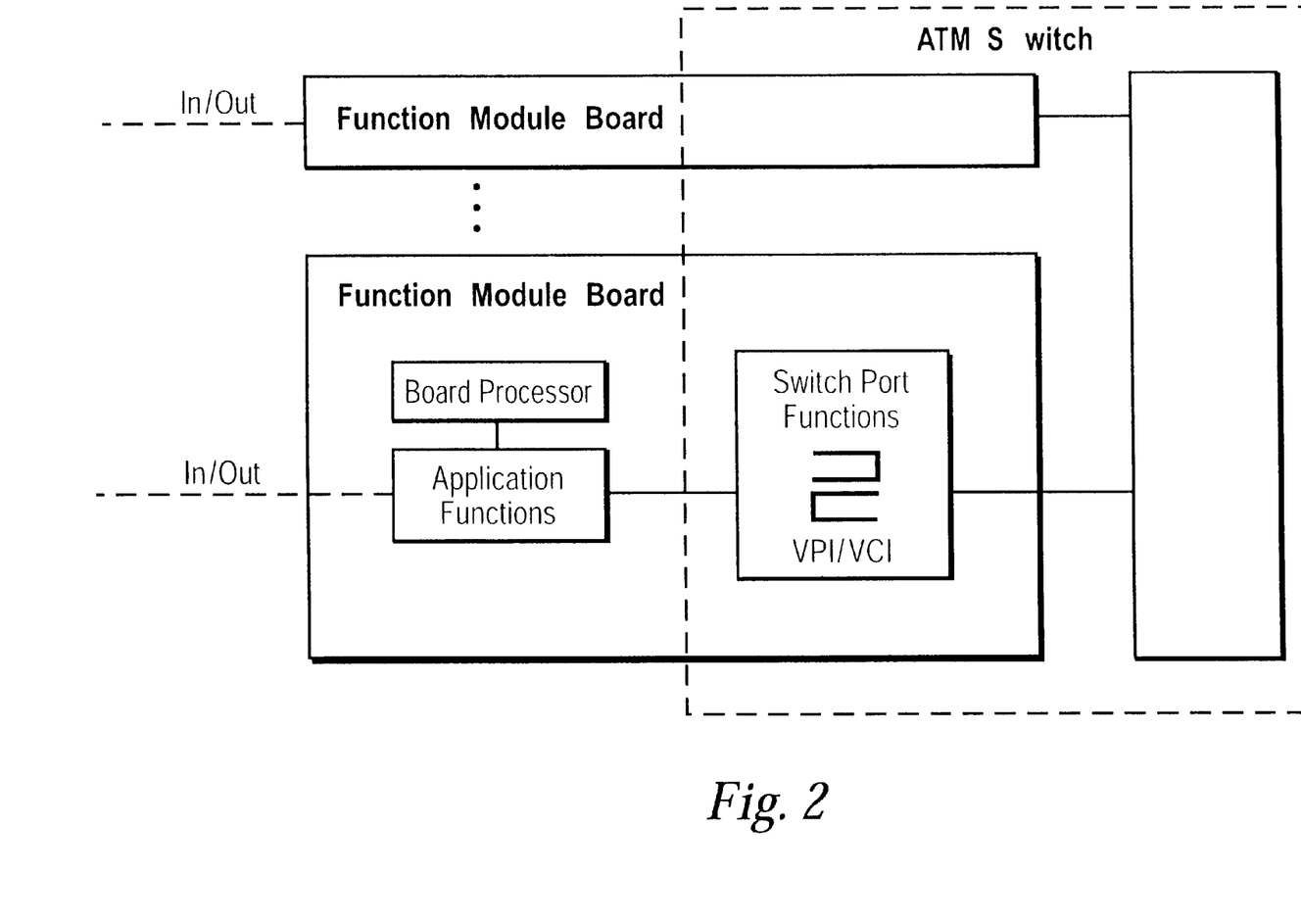
FIG. 2 is a block diagram showing in more detail the interface between function module boards and an ATM switch core.

Referring now to FIG. 2, each function module board (FMB) includes a data processor or group of data processors, memory, and dedicated hardware circuitry. Each FMB is connected to a slot of an ATM switch core. The ATM switch core consists of row-column units (RCUs) each associated with a slot, and ATM switch "ports" are logically associated with corresponding RCUs/slots. Accordingly, when a board processor is described as being "connected" with an ATM switch port, that connection is to be understood as a logical connection.

A portion of each function module board plus the ATM switch core makes up the ATM switch itself. The portion of each function module board included in the ATM switch, which may be viewed as the ATM switch port, preferably includes dedicated data processing and storage hardware resources for performing ATM switch port functions such as ingress and egress buffering of ATM calls, encapsulating data, adding ATM headers and routing tags, VPI/VCI cell analysis and translation, etc. Such buffering, analysis, and translation are necessary to establish a route through the ATM switch core.

Connected between the ATM switch ports associated with each function module board are physical transmission paths or links. Each link includes a link circuit that performs packaging of cells according to the particular protocol in use on that link. Each link may carry cells for a plurality of connections. Paths internal to the ATM switch core are selectively controlled so that particular ports of the core are connected to allow a message to travel from an ingress side of the switch to an egress side of the switch. The queues or buffers shown in each function module board for each ATM switch port store cells prior to switching through the ATM switch core. The switch core, with its row-column units, essentially functions like a cross-connect between ports of the ATM switch.

In situations where cells may have one of a plurality of priority of classes, as they do for different qualities of service, each processor board may have a number of queues or buffers corresponding to the number of priority classes. Cells are fed into an appropriate buffer by an input queue selector, and are read out of the buffer at an appropriate time by an output queue selector. Of course, the specific details of the ATM switch core and protocol used in the present invention is not limited to one ATM architecture or ATM protocol.

The particular applications executed by the board processors are isolated from the specific characteristics of the ATM protocol layer by an ATM adaptation layer (AAL). While the present invention is not limited to a specific ATM adaptation layer category or type, one preferred implementation uses AAL-2 between ATM switches and AAL-5 for ATM connections between board processor modules attached to a single ATM switch core. AAL-2 handles variable bit rates and performs functions such as segmentation and reassembly of user information, cell delay variation, handling of lost and misinserted cells, timing recovery, and monitoring and correction of AAL protocol control information errors. AAL-5 is specifically tailored to carrying data traffic typically found in local area networks and therefore finds good application to local, interprocessor communications. Any satisfactory ATM switch core and protocol topology may be used to implement an ATM platform at the mobile switching control 12 and base stations 20.

Another portion of each function module board includes what is generally indicated as application functions. While the application functions may be implemented using dedicated hardware circuitry, there are preferably software-implemented functions which permit additional flexibility to modify, upgrade, or add to existing application functions. Each FMB's application is usually dedicated to a specific functionality. In the context of the PLMN 10, example applications include radio transmitter receiver operations like channel coding and interleaving, radio path multiplexing, equalization, diversity handover, etc.

Significantly, the ATM architecture employed by the present invention permits the mobile radio network 10 to support many different types of services including connection-oriented and connection-less services. Indeed, the ATM platform of the mobile radio network 10 supports services falling into four categories:

loss sensitive and delay sensitive
loss insensitive and delay sensitive
loss sensitive and delay insensitive
loss insensitive and delay insensitive Fixed bandwidth may be reserved and allocated for a connection for a continuous bitstream of voice samples, a variable bitstream of interactive compressed video, and various other categories. Services span an entire spectrum from interactive, including telephony and on-line data retrieval, to distributed such as video and stereo hi-fi broadcasts, and to multicast for conferencing and database updates. The delivery of such a variety of multimedia services is accomplished in the radio network by the efficient use of bandwidth provided by the ATM platform.

Figure 3:
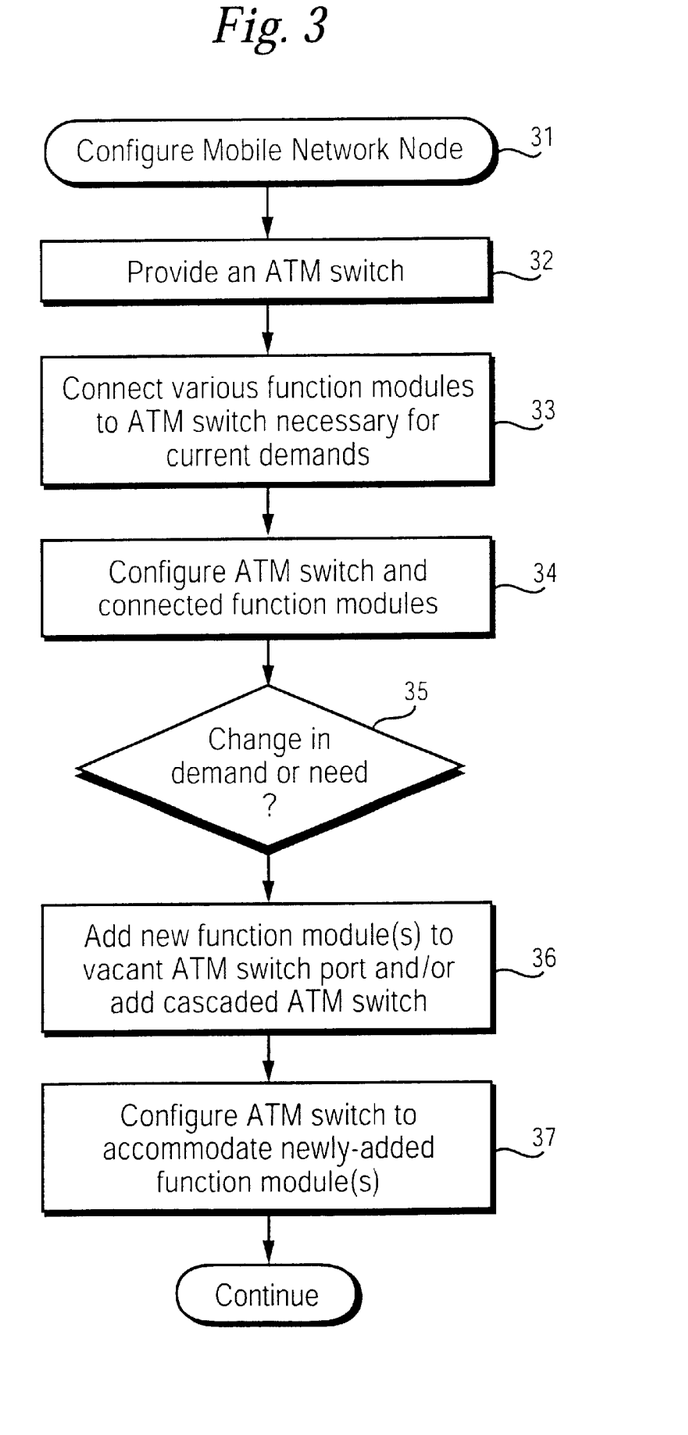
FIG. 3 is a flowchart diagram outlining an example method for configuring a mobile communications network node in accordance with the present invention.

Another significant advantage of the present invention is that the ATM-based architecture of the mobile switching controller 12 and base stations 20 permits easy node configuration and scalability at initial installation and as the needs of the mobile network 10 change. Reference is now made to a method in accordance with the present invention described in conjunction with "configure mobile network node" procedures (block 31), the basic steps or operations of which are illustrated in FIG. 3. "Mobile network node or station" is a general term meant to encompass nodes or stations within a mobile radio network such as base stations, base station controllers (BSCs), mobile switching controllers (MSCs), gateway mobile switching controllers (GMSCs), mobile packet switching nodes, and the nodes. The mobile network node is established using an ATM switch core (block 32), and various function modules boards are connected to that ATM switch core at appropriate ATM switch core slots to accommodate the current needs and demands to be placed on that node (block 33). The ATM switch is then configured to identify the processor(s) on each board with a corresponding ATM switch port (block 34). After configuration, the mobile network node is ready to perform its particular, e.g., dedicated, service(s) for supporting mobile radio communications in the network.

At any point in time, a decision may be made (block 35) whether the current functions and/or capacity in the mobile network node need to change. For example, if additional function(s) to support a new service or additional capacity to support new mobile subscribers is to be added to the mobile network node, one or more new function module boards can be added to vacant ATM switch core slots at the station. If necessary, an additional ATM switch-based node may be connected to one of the vacant slots via an extension module as described further below (block 36). The ATM switch is then configured to accommodate the newly-added function module boards (block 37) without reconfiguring existing and operating function module boards. Advantageously, it is not necessary to take any of the existing function module boards off-line while new function module boards are added.

Consequently, this method in accordance with the present invention permits a mobile network node to be configured for current needs rather than speculative or anticipated future needs, e.g., new services and/or subscribers. Then as functional needs and capacity requirements change (i.e., typically increase), the mobile network node is readily adapted to the new demands simply by adding additional function module boards to the ATM switch core and/or by modularly adding new ATM-based nodes.

Figure 4:
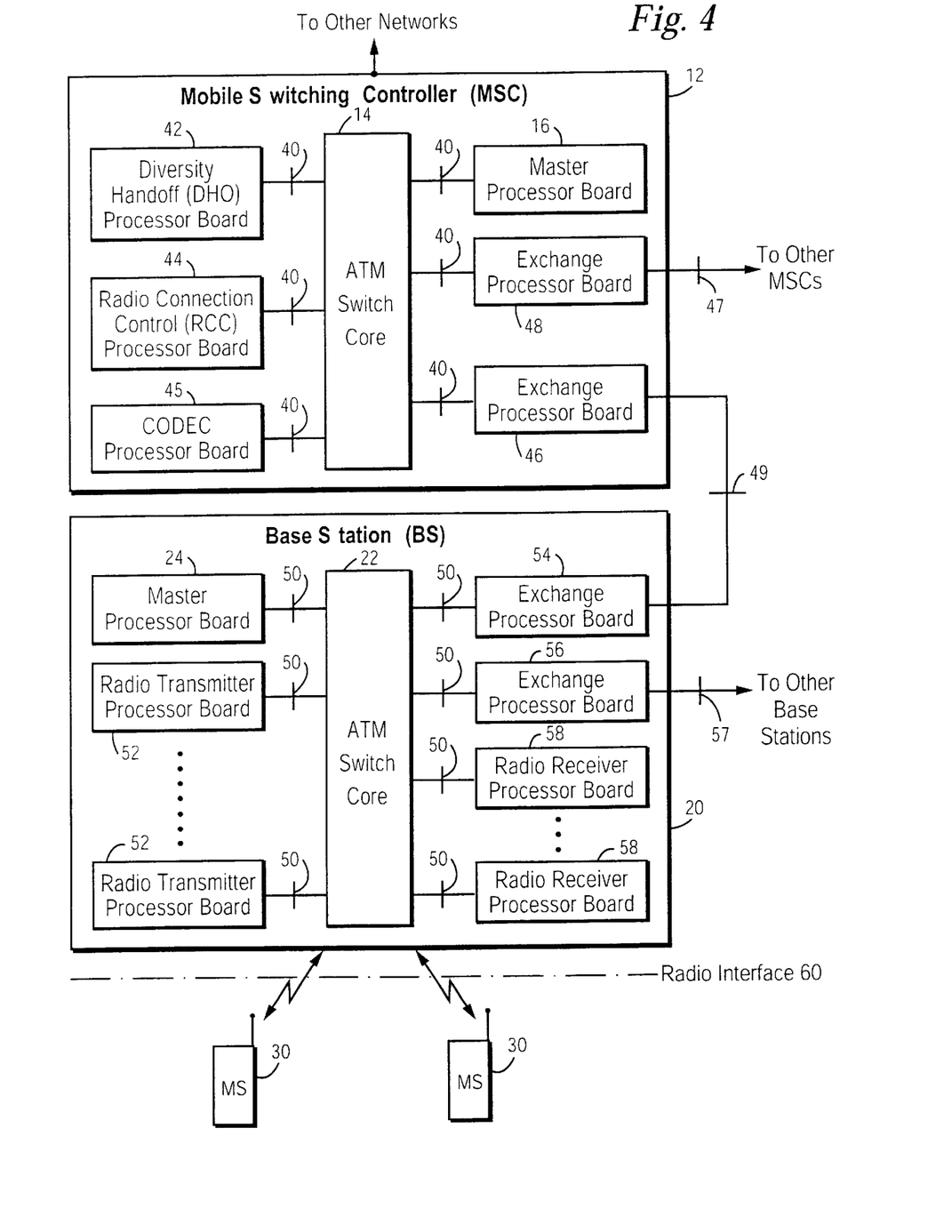
FIG. 4 shows in more detail the example embodiment of the present invention illustrated in FIG. 1.

Example function module boards that may be connected to the ATM switch core in the mobile switching controller 12 and a base station 20 are now described in conjunction with the function block diagram in FIG. 4. In mobile switching controller 12, a master processor board 16, a diversity handoff (DHO) processor board 42, radio connection control (RCC) processor board 44, a coder/decoder (CODEC) processor board 45, and extension processor boards 46 and 48 are connected to the ATM switch core 44 through suitable ATM interfaces 40. The radio interface 60 in an example application of the present invention is a wideband code division multiple access (W-CDMA) radio interface.

The characteristics of spread spectrum communications permit the system to receive mobile transmissions at multiple base stations simultaneously. In addition, the mobile station can simultaneously receive transmissions of two or more base stations. With these capabilities, it is possible to process a handoff from one base station to another, or from one antenna to another on the same base station, without any perceptible disturbance in the communications using a diversity handoff procedure. During such handoff, the signaling and voice information from multiple base stations must be combined (or bridged) at a common point based on the "quality" of the received data. Similarly, voice and signaling information may be transmitted from multiple base stations, and the mobile station combines the results. The common point in this example embodiment is in the mobile switching controller 12 (although it could be at another point in the network), and is orchestrated by the DHO processor 42.

The radio connection control (RCC) processor board 44 functions to monitor and supervise setup of calls to/from the mobile stations 30. The CODEC processor 45 translates between different traffic formats used within and outside the mobile network 10. Exchange terminal processor 48 coordinates communications with other ATM-based mobile switching controllers 12 included in the mobile network 10 by way of an AAL interface 47. Likewise, communications between the mobile switching controller 12 and each base station 20 are coordinated by a corresponding exchange terminal processor 46 over an AAL interface 49.

Each of the function module boards 16, 42, 44, 45, 46, and 48 connected to the ATM switch core 14 in the mobile switching controller 12 therefore performs its own dedicated application function or set of application functions. Signaling communications and traffic routings between the board processors are performed by way of the ATM switch core rather than using separate bus or other communications structures typically found in multiple processor architectures.

In the base station 20, the ATM switch core 22 is connected to a master processor board 24, several radio transmitter function module boards 52, exchange terminal function module boards 54 and 58, and several radio receiver exchange function module boards 58. Like the master processor board 16 in the mobile switching controller 12, the master processor 24 controls the overall operation of the base station 20, the configuration of the ATM switch core 22, and communications between the board processors 52–58. Since a primary functions of the base station 20 is to establish radio communications with various mobile stations over the radio interface 60, each radio transmitter and receiver in the base station is controlled using its own dedicated board processor. In a wideband CDMA system, the functions of the transmitter processor boards include: (1) mixing different channels to the mobile station over the air interface including pilot channels (transmitted continually to mobile station), synchronization channels, paging channels, and traffic channels, (2) encoding and scrambling channels, (3) adding appropriate CDMA "chip" codes, and (4) adding the "spread" signal to an appropriate RF carrier transmitted at an antenna. The functions of the radio receiver processor boards are basically opposite those of transmitter. Additionally, RAKE receiver operations are performed to capture signals from different points in time and then combine them into one signal.

The exchange terminal processor board 54 coordinates communications with the mobile switching controller 12 via AAL interface 49. Extension processor board 56 coordinates communications with other base stations over AAL interface 57. Indeed, the exchange processor boards in the mobile controller 12 and base station 20 permit modular expansion of the mobile radio network 10 as demands require. For example, additional base stations may be added by "cascading" additional base stations 20. Each cascaded base station includes its own ATM switch core and various processor boards attached to that ATM switch core. However, through exchange terminal processor board 56, the newly added base station need not have a master processor board 24, and the master processor board 24 from the original base station may, in a preferred example embodiment, assume control of the processor boards in both base station nodes.

Figure 5:
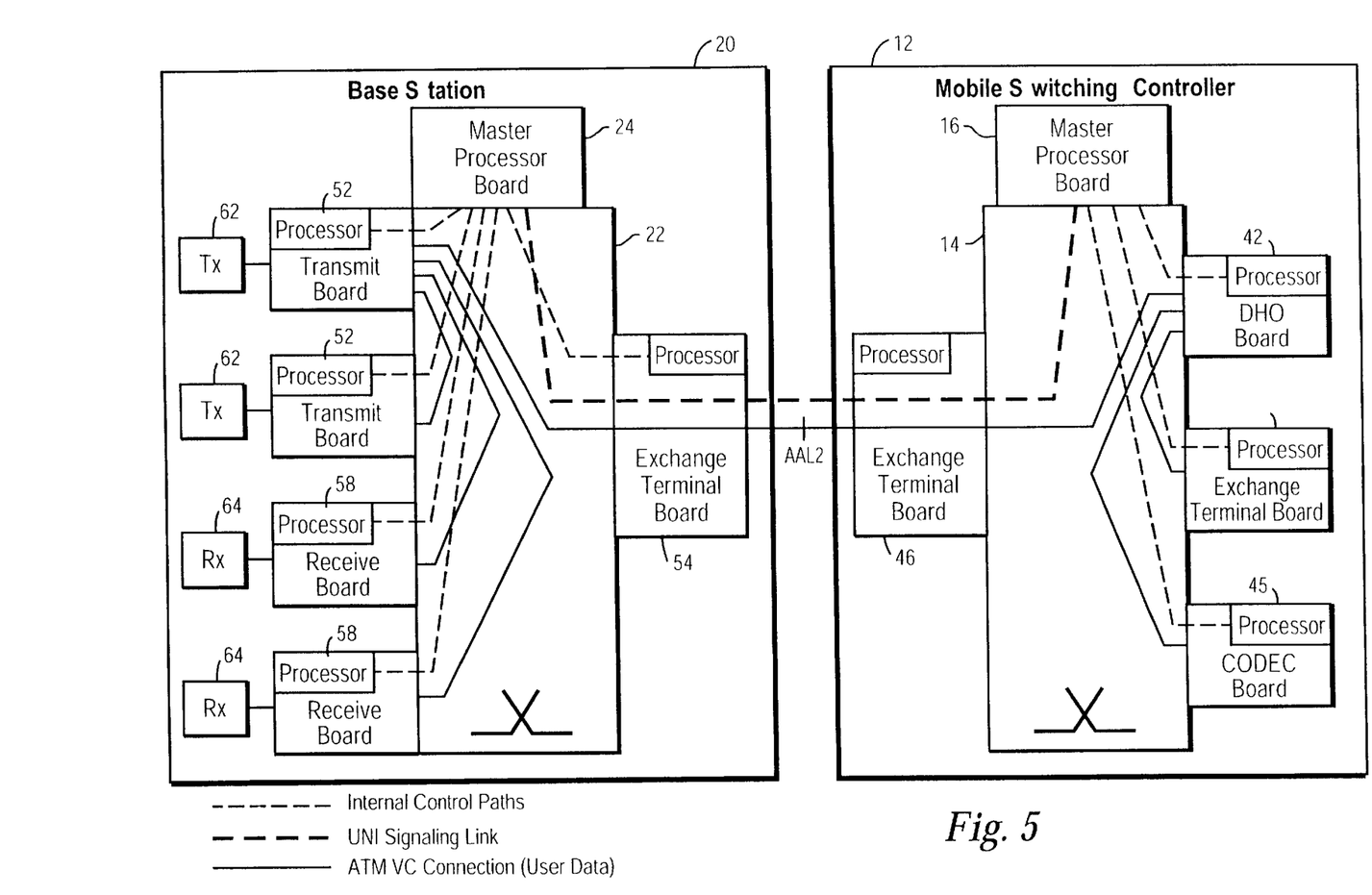
FIG. 5 is a function block diagram illustrating different communications paths and ATM traffic connections between two ATM-based nodes in accordance with the example embodiment of the present invention.

FIG. 5 is a functional block diagram illustrating the types of connections which may be established via the ATM switch cores 14 and 22. There are three different types of signals shown including internal control paths shown as a dashed dot line, a User Network Interface (UNI) path shown as a bold dashed line, and an ATM virtual connection path corresponding to user data/traffic shown as a solid line. Each of the processor modules other than the master processor is shown as having a board processor (BP) to which the internal control path lines are directly connected. The UNI signaling link is used to establish an ATM virtual connection with a specified bandwidth over the link. The ATM virtual connections routes mobile station traffic between board processors and between exchange terminal boards 54 and 56.

The present invention may also be advantageously applied to more sophisticated radio communications networks that include a large number of mobile network nodes. One such mobile network is a universal radio access network (URAN) 100 illustrated in FIG. 6. The URAN 100 provides communications between various information-communication (Infocom) networks, examples of which include the PSTN/ISDN 12 and the Internet 114, and the radio mobile stations 128. Virtually any Infocom network may be interfaced for communications with the mobile stations 128 through an appropriate Infocom access network node(s). For example, the PSTN/ISDN 112 obtains access through a circuit-switched access network 118 using well-known signaling system 7 (SS7) protocols such as ISUP. Similarly, Internet access is provided via a packet-switched access network 120 using well-known Internet protocols such as TCP/IP.

Figure 7:
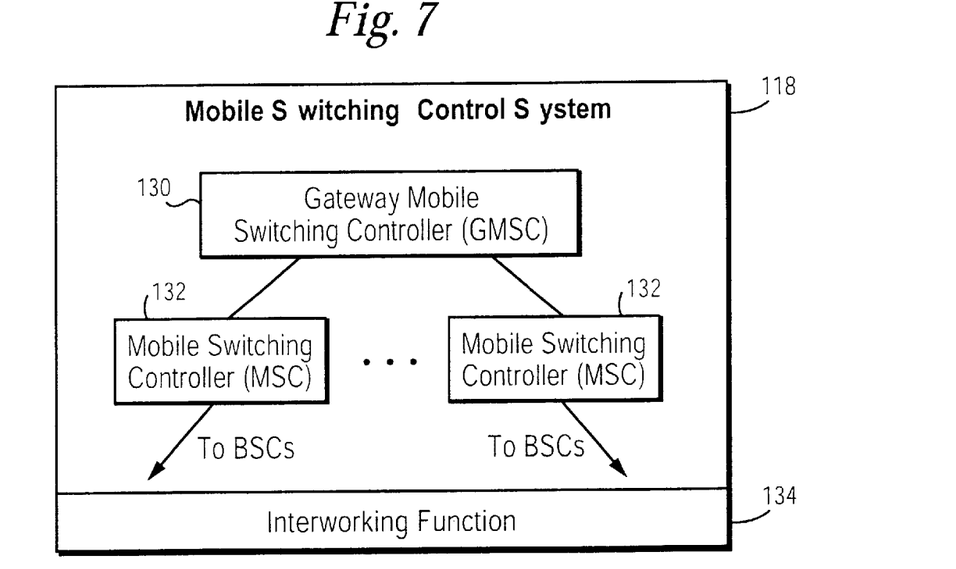
FIG. 7 is a function block diagram of a circuit-switched access network shown in FIG. 6.
Figure 8:
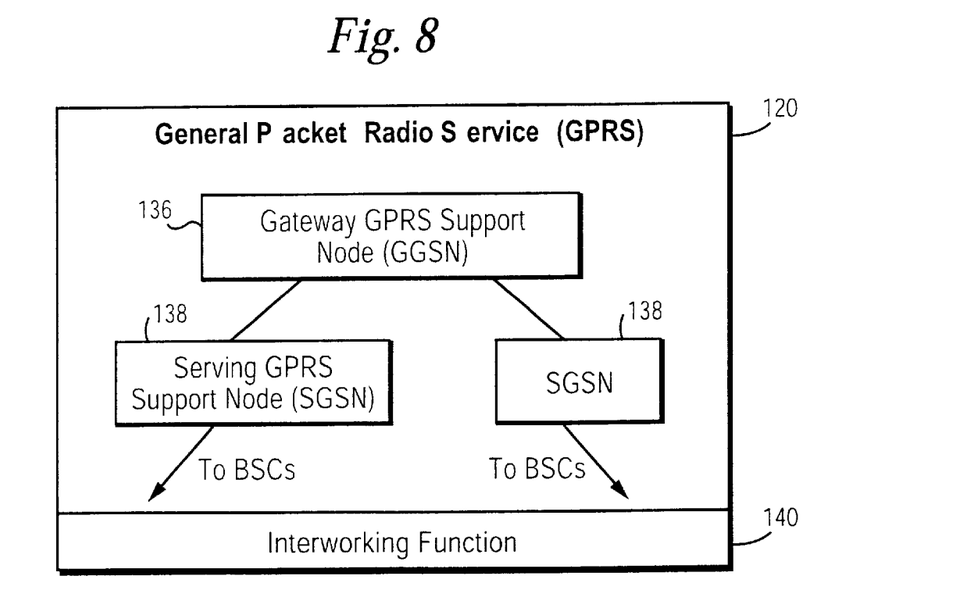
FIG. 8 is a more detailed function block diagram of the packet switch access network shown in FIG. 7.

As illustrated in further detail in FIGS. 7 and 8, the circuit-switched access network 118 and packet-switched access network 120 each include a hierarchy of mobile network nodes for connecting to base station controllers (BSC) 124 in the radio access network 122. In FIG. 7, the circuit-switched access network 118 may correspond to a known mobile switching control system that employs a gateway mobile switching controller (GMSC) 130 connected to plural mobile switching controllers 132 each of which in turn is connected to one or more base station controllers 124 via an interworking function 134. The interworking function translates protocols between networks, e.g., converts compressed voice packets to 64 kbps at the PSTN, terminates ATM protocols, translates radio link protocol to TCP/IP for the Internet, etc. The mobile switching controllers 134 were described above. The gateway MSC is the point in the radio network where calls to mobile stations enter for initial routing. The GMSC contains signaling functions for retrieving information from mobile radio databases used in call setup. Depending on the interrogation result, the call is then rerouted by the GMSC to the MSC where the mobile subscriber is located. Real world examples of such mobile switching are found in the Global System for Mobile communications (GSM) and other similar cellular radio communications network platforms.

As illustrated in FIG. 8, the packet-switched access network 120 may correspond to a General Packet Radio Service (GPRS) which also may be adapted from an existing GSM or other cellular telephone network. A gateway GPRS support node (GGSN) 136 is connected to a number of serving GPRS support nodes (SGSNs) 138 which in turn are connected to one or more of the base station controllers 124 via interworking function 140. Each of the nodes 136 and 138 function in much the same fashion as the corresponding nodes in the circuit-switched access network 118 except the communications are packet-switched.

Returning to FIG. 6, the radio access network 122 includes a plurality of base station controllers (BSCs) 124 each connected to plural base stations 126 for communication over a wideband CDMA interface with mobile stations 128. Base station controllers may also be referred to as Radio Network Controllers (RNCs). Each base station controller handles all radio-related functions and is a focal point for communications with each of its assigned base stations 126. In this architecture, the BSC may manage configuration of its assigned base stations 126 and provide several administration and control functions such as handling connections to mobile stations including handovers.

Figure 6:
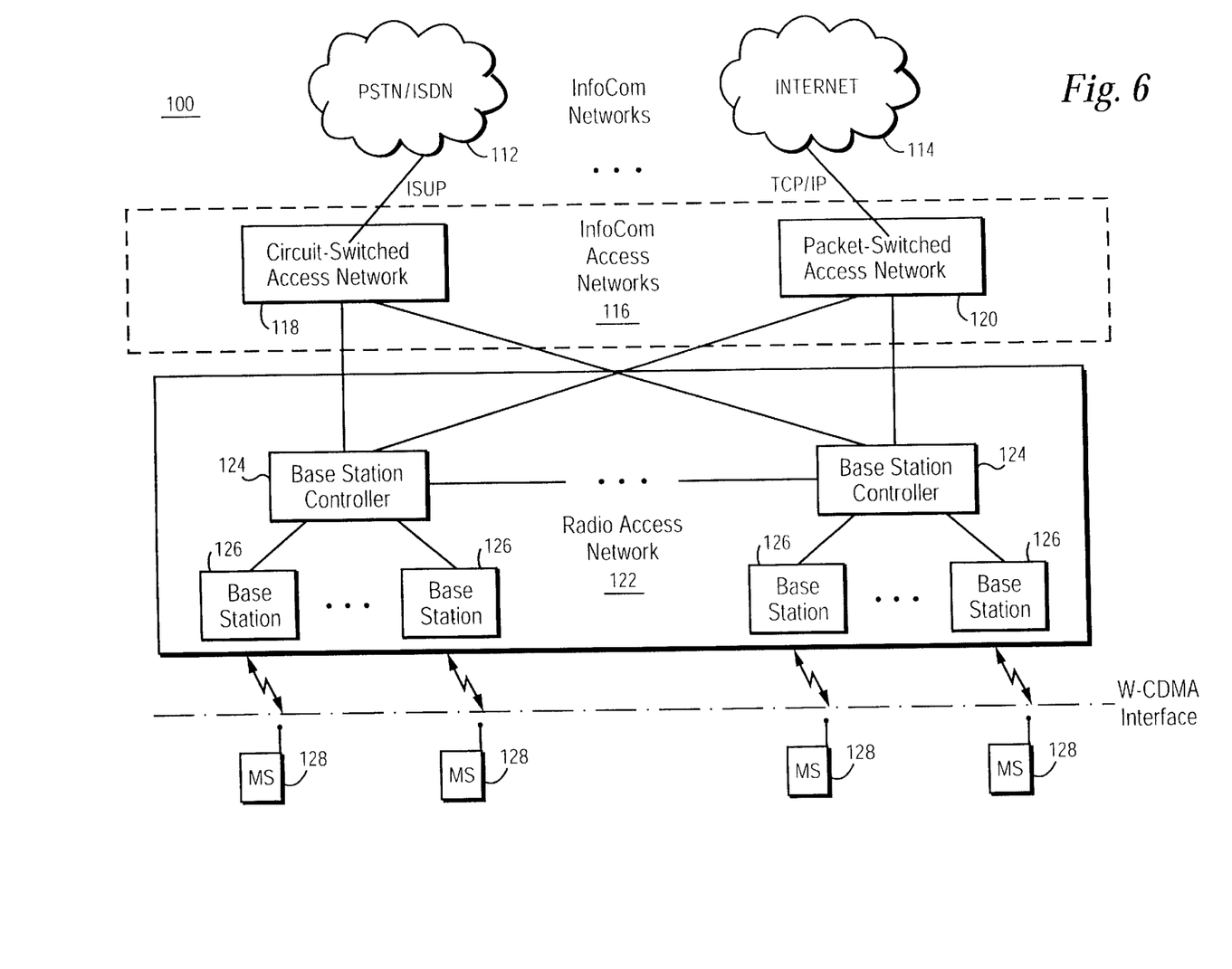
FIG. 6 illustrates an example application of the present invention to a generic radio access network (GRAN)

In accordance with the present invention, each node in the universal radio access network 100 including each base station 126, base station controller 124, mobile switching controller 132, gateway mobile switching controller 130, serving GPRS support node 138, and gateway GPRS support node 136 may be built and operated using an ATM switching platform. Various node functions may be dedicated and performed by a processor board connected to the ATM switch core. In this way, each node benefits by the increased efficiency provided by the asynchronous transfer of information as well as modular scalability with minimum impact.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. For use in a mobile radio communications network for communicating with plural mobile radio units over a radio interface, a radio communications network node comprising:
   an asynchronous transfer mode (ATM) switch core with a plurality of function module board slots, each for receiving a function module board, and
   plural function module boards, each function module board inserted in one of the function module board slots of the ATM switch core,
   wherein each function module board includes: (1) ATM processing circuitry for performing one or more ATM switch functions such that the ATM processing circuitry for each function module board and the ATM switch core make up an ATM switch, and (2) application processing circuitry for performing one or more functions related to a radio network application, and
   wherein the ATM switch core is capable of receiving and configuring a newly-added function module board inserted into a vacant ATM switch core slot without requiring reconfiguration of existing, already-configured function module boards.

2. The radio communications network node in claim 1, wherein the ATM processing circuitry in each of the function module boards performs one or more of the following ATM switch functions: ingress buffering, egress buffering, encapsulating data, adding ATM headers and routing tags, and virtual path identifier (VPI)/virtual channel identifier (VCI) cell analysis and translation.

3. The radio communications network node in claim 1, wherein the application processing circuitry in one of the plural function modules is a master function module board for coordinating operations of and communications between the function module boards via signaling transmitted through the ATM switch core.

4. The radio communications network node in claim 1, wherein the radio communications network node is a radio base station and the application processing circuitry in one or more the function modules is configured to perform radio transmitter functions and the application processing circuitry in one or more the function modules is configured to perform radio receiver functions.

5. The radio communications network node in claim 1, wherein the radio communications network node is a radio network controller coupled to plural radio base stations, and the application processing circuitry in one or more the function module boards is configured to perform diversity handover functions.

6. The radio communications network node in claim 1, wherein the radio communications network node is a radio network controller coupled to plural radio base stations, and the application processing circuitry in one or more the function module boards is configured to perform radio connection control functions.

7. The radio communications network node in claim 1, wherein one of the function module boards is an extension module board whose application processing circuitry is configured to coordinate communication with another ATM switch over an ATM adaptation layer (AAL) interface.

8. The radio communications network node in claim 1, wherein the radio communications network node is a mobile switching controller, and the application processing circuitry in one or more the function modules is configured to perform coder-decoder (CODEC) functions.

9. The radio communications network node in claim 1, wherein the radio communications network node is a serving GPRS support node (SGSN).

10. The radio communications network node in claim 1, wherein the radio communications network node is a gateway GPRS support node (GGSN).

11. The radio communications network node in claim 1, wherein at least some of the function module boards are configured to communicate messages over control paths internal to the ATM switch core.

12. The radio communications network node in claim 1, wherein at least some of the function module boards are configured to communicate user traffic over ATM virtual connection paths internal to the ATM switch core.

13. For use in a mobile radio communications network for communicating with plural mobile radio units over a radio interface, a radio communications network node comprising:

an asynchronous transfer mode (ATM) switch core with a plurality of function module board slots, each for receiving a function module board, and plural function module boards, each function module board inserted in one of the function module board slots of the ATM switch core, wherein each function module board includes: (1) ATM processing circuitry for performing one or more ATM switch functions such that the ATM processing circuitry for each function module board and the ATM switch core make up an ATM switch, and (2) application processing circuitry for performing one or more functions related to a radio network application, and wherein one of the function module boards is an extension module board configured to permit addition of a new radio communications network node to the radio communications network via connection to the extension module board.

14. A radio communications system, comprising:

one or more access network nodes coupled to an external circuit-switched or packet-switched network;

a radio network controller coupled to the access network node; and plural radio base stations coupled to the radio network controller for communicating with plural mobile radios over a radio interface, wherein one or more of the access network node, radio network controller, and the plural radio base stations includes:

an asynchronous transfer mode (ATM) switch core with a plurality of function module board slots, each for receiving a function module board, and plural function module boards, each function module board inserted in one of the function module board slots of the ATM switch core, each function module board including: (1) ATM processing circuitry for performing one or more ATM switch functions such that the ATM processing circuitry for each function module board and the ATM switch core make up a ATM switch, and (2) application processing circuitry for performing one or more functions related to a radio network application, wherein the ATM switch core is capable of receiving and configuring a newly-added function module board inserted into a vacant ATM switch core slot without requiring reconfiguration of existing, already-configured function module boards.

15. The radio communications system in claim 14, wherein the ATM processing circuitry in each of the function module boards performs one or more of the following ATM switch functions: ingress buffering, egress buffering, encapsulating data, adding ATM headers and routing tags, and virtual path identifier (VPI)/virtual channel identifier (VCI) cell analysis and translation.

16. The radio communications network node in claim 14, wherein the application processing circuitry in one of the plural function modules is a master function module board for coordinating operations of and communications between the function module boards via signaling transmitted through the ATM switch core.

17. The radio communications network node in claim 14, wherein one of the function module boards is an extension module board whose application processing circuitry is configured to coordinate communication with another ATM switch over an ATM adaptation layer (AAL) interface.

18. The radio communications network node in claim 14, wherein the one or more access network nodes include a mobile switching center (MSC) and a gateway GPRS support node (GGSN).

19. The radio communications network node in claim 14, wherein the radio network controller and the radio base stations each include:

an asynchronous transfer mode (ATM) switch core with a plurality of function module board slots, each for receiving a function module board, and plural function module boards, each function module board inserted in one of the function module board slots of the ATM switch core, each function module board including: (1) ATM processing circuitry for performing one or more ATM switch functions such that the ATM processing circuitry for each function module board and the ATM switch core make up a ATM switch, and (2) application processing circuitry for performing one or more functions related to a radio network application.

20. The radio communications network node in claim 14, wherein at least some of the function module boards are configured to communicate messages over control paths internal to the ATM switch core.

21. The radio communications network node in claim 14, wherein at least some of the function module boards are configured to communicate user traffic over ATM virtual connection paths internal to the ATM switch core.

22. For use in a mobile radio communications network for communicating with plural mobile radio units over a radio interface, a radio communications network node comprising:

an asynchronous transfer mode (ATM) switch core with a plurality of function module board slots, each for receiving a function module board, and plural function module boards, each function module board inserted in one of the function module board slots of the ATM switch core, wherein ones of the function module boards communicate information over paths internal to the ATM switch core, and wherein the ATM switch core is capable of receiving and configuring a newly-added function module board inserted into a vacant ATM switch core slot without requiring reconfiguration of existing, already-configured function module boards.

23. The radio communications network node in claim 22, wherein ones of the function module boards are configured to communicate messages over control paths internal to the ATM switch core.

24. The radio communications network node in claim 22, wherein ones of the function module boards are configured to communicate user traffic over ATM virtual connection paths internal to the ATM switch core.

25. For use in a mobile radio communications network for communicating with plural mobile radio units over a radio interface, a radio communications network node comprising:

an asynchronous transfer mode (ATM) switch core with a plurality of function module board slots, each for receiving a function module board, and plural function module boards, each function module board inserted in one of the function module board slots of the ATM switch core, wherein ones of the function module boards communicate information over paths internal to the ATM switch core, and wherein one of the function module boards is an extension module board configured to permit addition of a new radio communications network node to the radio communications network via connection to the extension module board.

26. The radio communications network node in claim 22, wherein one of the function module boards is a master function module board for coordinating operations of and communications between the function module boards via signaling paths internal to the ATM switch core.

27. For use in a mobile radio communications network for communicating with plural mobile radio units over a radio interface, a radio base station comprising:

an asynchronous transfer mode (ATM) switch core with a plurality of function module board slots, each for receiving a function module board, and plural function module boards, each function module board inserted in one of the function module board slots of the ATM switch core, wherein one of the function module boards is coupled to radio transmitter circuitry and is configured to perform code division multiple access (CDMA) radio transmitter functions and one of the function module boards is coupled to radio receiver circuitry and is configured to perform CDMA radio receiver functions, and wherein one of the function module boards is an extension module board configured to permit addition of a new radio base station via connection to the extension module board.

28. The radio base station in claim 27, wherein one of the function module boards is a master function module board for coordinating operations of and communications between the function module boards via signaling transmitted through the ATM switch core.

29. The radio base station in claim 27, wherein the transmitter function module board and the receiver function module board are configured to communicate user traffic over ATM virtual connection paths internal to the ATM switch core.

30. The radio base station in claim 27, wherein one of the function module boards is an extension module board configured to permit addition of a new radio base station via connection to the extension module board.

31. For use in a mobile radio communications network for communicating with plural mobile radio units over a radio interface, a radio base station comprising:

an asynchronous transfer mode (ATM) switch core with a plurality of function module board slots, each for receiving a function module board, and plural function module boards, each function module board inserted in one of the function module board slots of the ATM switch core, wherein one of the function module boards is coupled to radio transmitter circuitry and is configured to perform code division multiple access (CDMA) radio transmitter functions and one of the function module boards is coupled to radio receiver circuitry and is configured to perform CDMA radio receiver functions, and wherein one of the function module boards is an extension module board configured for a connection with another radio network node.

32. For use in a mobile radio communications network for communicating with plural mobile radio units over a radio interface, a radio network controller node comprising:

an asynchronous transfer mode (ATM) switch core with a plurality of function module board slots, each for receiving a function module board, and plural function module boards, each function module board inserted in one of the function module board slots of the ATM switch core and configured to perform one or more ATM switch-related functions and one or more radio network-related functions, wherein one of the function module boards is configured to perform radio connection control functions and another of the function module boards is configured to perform diversity handover control functions, and wherein one of the function module boards is an extension module board configured to permit addition of a new radio base station or a new radio network controller node via connection to the extension module board inserted in an ATM switch core slot.

33. The radio network controller node in claim 32, wherein one of the plural function module boards is a master function module board coordinating operations of and communications between the function module boards via signaling transmitted through the ATM switch core.

34. A method for use in a mobile radio communications network including radio base station nodes for communicating with mobile radios over a radio interface and a control node coupled to the radio base station nodes, where one or more of the nodes includes an asynchronous transfer mode (ATM) switch core with function module boards inserted into slots of the ATM switch core, a method implemented in the one or more nodes, comprising:

each function board module performing one or more ATM switch-related functions and one or more radio network-related functions;

sending information between the function module boards using paths in the ATM switch core; and modularly adding another function module board to a vacant ATM switch core slot without having each existing function module board stop performing its one or more ATM switch-related functions and one or more radio network-related functions.

35. The method in claim 34, configuring the added function module board without having to reconfigure the existing function module board.

36. The method in claim 34, wherein one of the function module boards is an exchange module, the method further comprising:

adding a new radio base station node to the mobile radio communications system by connecting the new radio base station node to the exchange module.

37. The method in claim 34, wherein one of the function module boards is a master controller for controlling configuration of the function module boards inserted into ATM switch core slots and communications between the function module boards.

* * * * *